(12) United States Patent
Ambatipudi et al.

(10) Patent No.: US 6,414,856 B1
(45) Date of Patent: Jul. 2, 2002

(54) METHOD AND APPARATUS FOR MULTIPLE OUTPUT CONVERTER WITH IMPROVED MATCHING OF OUTPUT VOLTAGES

(75) Inventors: Ravindra Ambatipudi, Milpitas; Mark Hartman, Santa Clara, both of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/903,372

(22) Filed: Jul. 10, 2001

(51) Int. Cl.[7] .................. H02M 3/335; H02M 1/12
(52) U.S. Cl. .................. 363/21.12; 363/21.17; 363/40
(58) Field of Search .............. 363/21.12, 21.17, 363/39, 40, 95, 97, 131

(56) References Cited

U.S. PATENT DOCUMENTS

| | | | | |
|---|---|---|---|---|
| 5,673,185 A | * | 9/1997 | Albach et al. | 363/45 |
| 5,936,857 A | | 8/1999 | Jacobs et al. | 363/100 |
| 6,078,509 A | | 6/2000 | Jacobs et al. | 363/21 |
| 6,155,271 A | * | 9/2000 | Mo | 363/65 |
| 6,189,639 B1 | * | 3/2001 | Wolfgart et al. | 363/21.15 |
| 6,252,784 B1 | * | 6/2001 | Dobrenko | 363/21.12 |

* cited by examiner

*Primary Examiner*—Bao Q. Vu
(74) *Attorney, Agent, or Firm*—Merchant & Gould PC; Brett A. Hertzberg

(57) ABSTRACT

A method and apparatus is arranged to produce high precision output voltage matching in a multiple output power converter. A two-output voltage converter includes a positive and a negative voltage output that are approximately equal in magnitude. The power converter includes inductors, transfer capacitance circuitry, and a controlled switching circuit. In one operating mode, the switching circuit is closed, the inductors are charged, and energy from the input signal is stored in the transfer capacitance circuitry. In a second operating mode, the switching circuit is opened, and the stored energy is transferred to the output loads. The transfer capacitance circuitry is arranged to provide improved matching in the output voltages. The two-output power converter topology may be extended to provide multiple outputs.

17 Claims, 7 Drawing Sheets

METHOD AND APPARATUS FOR MULTIPLE
OUTPUT CONVERTER WITH IMPROVED
MATCHING OF OUTPUT VOLTAGES

FIELD OF THE INVENTION

The present invention relates to the field of power supplies, and in particular, to a method and apparatus directed to a multiple output power converter with higher precision on matching output voltages.

BACKGROUND OF THE INVENTION

Power converters are employed in a wide variety of electronic systems, including personal computers, cable modems, disk drives, calculators, televisions, test-equipment, and hi-fi equipment. A power converter, also called a power supply, is a device for the conversion of available power with one set of characteristics to another set of characteristics. A power converter may be used to produce a regulated (or controlled) output voltage from an unregulated input voltage. The regulated output voltage may have a magnitude and possibly a polarity that differs from the input voltage. For example, a 120 V ac utility voltage may be rectified or converted to produce a dc voltage of about 170 V. A dc—dc converter may then be employed to reduce the voltage to a regulated 5 V.

Because of its circuit simplicity and relative low cost, a flyback type of converter has become a favored topology for high-voltage power supplies such as televisions and computer monitors. The flyback converter topology also finds wide appeal in switching power supplies in the 50–100 watt power range.

An example of a conventional two-output flyback converter (100) is shown in FIG. 1. As shown in the figure, the conventional two-output flyback converter (100) includes a primary transformer winding (L11), a switch device (SW11), a secondary transformer winding (L12), a tertiary transformer winding (L13), a primary output diode (D11), a secondary output diode (D12), a primary output capacitor (C11), and a secondary output capacitor (C12).

In FIG. 1, the primary transformer winding (L11) is connected between nodes N101 and N104. The switching device (SW11) is connected between node N104 and a circuit ground potential (GND). The secondary transformer winding (L12) is connected between node N102 and a circuit ground potential (GND). The primary output diode (D11) is connected between node N102 and node N103. The primary output capacitor (C11) is connected between node N103 and a circuit ground potential (GND). The tertiary transformer winding (L13) is connected between node N105 and node N107. The secondary output diode (D12) is connected between node N105 and node N106. Node N106 is connected to a circuit ground potential (GND). The secondary output capacitor (C12) is connected between node N107 and node N106. A core (F11), such as a ferrite core, is located between the primary transformer winding (L11), the secondary transformer winding (L12), and the tertiary transformer winding (L13).

Although the transformer windings (L11–L13) and the core (F11) appear similar to a transformer, it is more descriptively referred to as a "three winding inductor." Unlike an ideal transformer, the current does not flow simultaneously in the first and second (or third) windings of the conventional two-output flyback converter (100). Instead, the flyback converter's magnetizing inductance assumes the role of an inductor and a magnetizing current is switched between the primary transformer winding (L11), the secondary transformer winding (L12) and the tertiary transformer winding (L13), during the flyback's operation.

In operation, an input voltage (Vin) is coupled to node N101, and the flyback converter (100) provides a primary output voltage (Vo11) and a secondary output voltage (Vo12) at nodes N103 and N107 respectively. The primary (Vo11) and secondary (Vo12) output voltages are coupled to a primary and secondary load (not shown). The flyback converter has two operating modes corresponding to the operation of the switching device (SW11).

During the first mode of operation of the flyback converter (100), the switching device (SW11) is closed (the "on" period). The winding polarity of the transformer ensures that the output diodes (D11) and (D12) are reverse-biased so that no transformer secondary current flows through the secondary transformer winding (L12). The primary transformer winding (L11) functions as an inductor, connected through node N101 to the input voltage (Vin) and producing a primary current. The primary current rises linearly in the primary transformer winding (L11) during this period. The transformer is designed to have a high inductance so that energy is stored in the magnetic field. The output capacitors (C11) and (C12) act as reservoirs (having been charged during the "off" periods) maintaining the voltages across the loads (not shown).

In the second mode of operation (the "off" period), the switch circuit (SW11) is opened and the primary current ceases to flow in the primary transformer winding (L11). The magnetizing current is then referred to the secondary transformer winding (L12) and the output diodes (D11) and (D12) now become forward biased. Thus, energy stored in the magnetic field of the converter during the "on" period of the switching device (SW11) is transferred to the output loads (not shown) creating the first and secondary output voltages (Vo11 and Vo12).

SUMMARY OF THE INVENTION

The present invention is directed to provide a method and apparatus that produces high precision output voltage matching in a multiple output power converter. In a conventional multiple output power converter, such as a flyback converter, poor output voltage precision often is a result of the non-ideal characteristics of the components used in the circuit. The present invention minimizes the effects of the non-ideal characteristics of the components by the incorporation of transfer capacitance circuits. As a result, the output voltages are closer together in their magnitudes, resulting in higher precision in matching output voltage.

In accordance with one embodiment of the present invention, an apparatus is directed to producing multiple output signals from an input signal. The apparatus includes inductive windings, transfer capacitance circuits, rectifier capacitance circuits, output capacitance circuit, and a switching circuit. In the apparatus, a first inductive winding is magnetically coupled to a second inductive windings. A first transfer capacitance circuit is coupled to the first and second inductive winding. A first rectifier circuit is coupled to the second inductive winding and a first output terminal. A first output capacitance circuit is coupled to the first output terminal and a circuit ground potential. A second transfer capacitance circuit is coupled to the first inductive winding and a third inductive winding. A second rectifier circuit is coupled to the third inductive winding and the circuit ground potential. Additionally, a second output capacitance circuit is coupled to the second output terminal and the circuit ground potential. In the apparatus, the first and second transfer capacitance circuits store energy in response to the input signal when the switching circuit is in a closed position. The first and second transfer capacitance circuits transfer energy through the first and second output terminals respectively when the switching circuit is in an open position. One of the multiple output signals is associated with the first output terminal and a second of the multiple output signals is associated with the second output terminal. The output signals associated with the first and second output terminals have substantially the same magnitude. Moreover, the first, second, and third inductive windings may be wound on a common core.

The apparatus above can be extended by further including at least one additional circuit that is arranged to provide an additional one of the multiple output signals. Each of the additional circuits includes an additional inductive winding, an additional transfer capacitance circuit that is coupled to the first inductive winding and the additional inductive winding, and an additional rectifier circuit that is coupled to the additional inductive winding and an additional output terminal. Further, each additional circuit includes an additional output capacitance circuit that is coupled to the additional output terminal and the circuit ground potential. The additional transfer capacitance circuit is arranged to store energy in response to the input signal when the switching circuit is in the closed position. The additional transfer capacitance circuit is arranged to transfer energy through the additional output terminal when the switching circuit is in the open position such that a third one of the multiple output signals is associated with the additional output terminal.

In accordance with yet another embodiment of the present invention, a method is directed to provide output signals to a first and second output load circuit in response to an input signal. The method includes closing a switching circuit during a first operating mode and opening the switching circuit during a second operating mode. The first operating mode includes charging a first inductive winding in response to the input signal. The first operating mode further includes charging the second inductive winding through a first transfer capacitance circuit. Included in the method is coupling of magnetic energy from the first inductive winding to a second inductive winding. Further included in the first operating mode is the charging of the third inductive winding through a second transfer capacitance circuit. Moreover, the first operating mode includes providing an output signal to the first output load from a first output capacitor, and providing a second output signal to the second output load from a second output capacitor and through the second inductive winding and the second transfer capacitance circuit.

The second operating mode of the method includes storing energy in the first output capacitance circuit, storing energy in the first transfer capacitance circuit, and storing energy in the second transfer capacitance circuit. The second operating mode further includes providing the first output signal to the first output load from the second inductive winding and the first transfer capacitance circuit, and providing the second output signal to the second output load from the third inductive winding and the second transfer capacitance circuit. The first one of the output signals and the second one of the output signals have substantially the same magnitudes.

In yet another embodiment of the invention, an apparatus is directed to provide a positive output signal to a first output load and a negative output signal to a second output load circuit in response to an input signal. The apparatus includes a first inductive means that stores energy in response to the input signal, a first charging means that charges the first inductive means when active, and a first capacitive means that is coupled across the first output load circuit and arranged store energy when the first charging means is inactive. The first capacitive means is directed at providing the first output signal to the first output load circuit when the first charging means is active. The apparatus further includes a second inductive means that is magnetically coupled to the first inductive means. The second inductive means of the apparatus is selectively coupled across the first output load circuit when the first charging means is inactive. Further, the apparatus includes a second charging means is charged by the first inductive means when the first charging means is inactive. The second charging means is arranged to charge the second inductive means when the first charging means is active, such that the second inductive means and the second charging means provide energy to the first output load circuit when the first charging means is inactive. Also included is a third inductive means that is selectively coupled across the second output load circuit, and a third charging means that is charged by the first inductive means when the first charging means is inactive. The third charging means of the apparatus is arranged to charge the third inductive means when the first charging means is active, such that the third inductive means provides energy to the second output load circuit and the third charging means provides energy to the second output load circuit when the first charging means is inactive. The apparatus provides energy to the first output load circuit and the energy to the second output load circuit having substantially the same magnitude.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE PREFERRED EMBODIMENT

Figure 1:
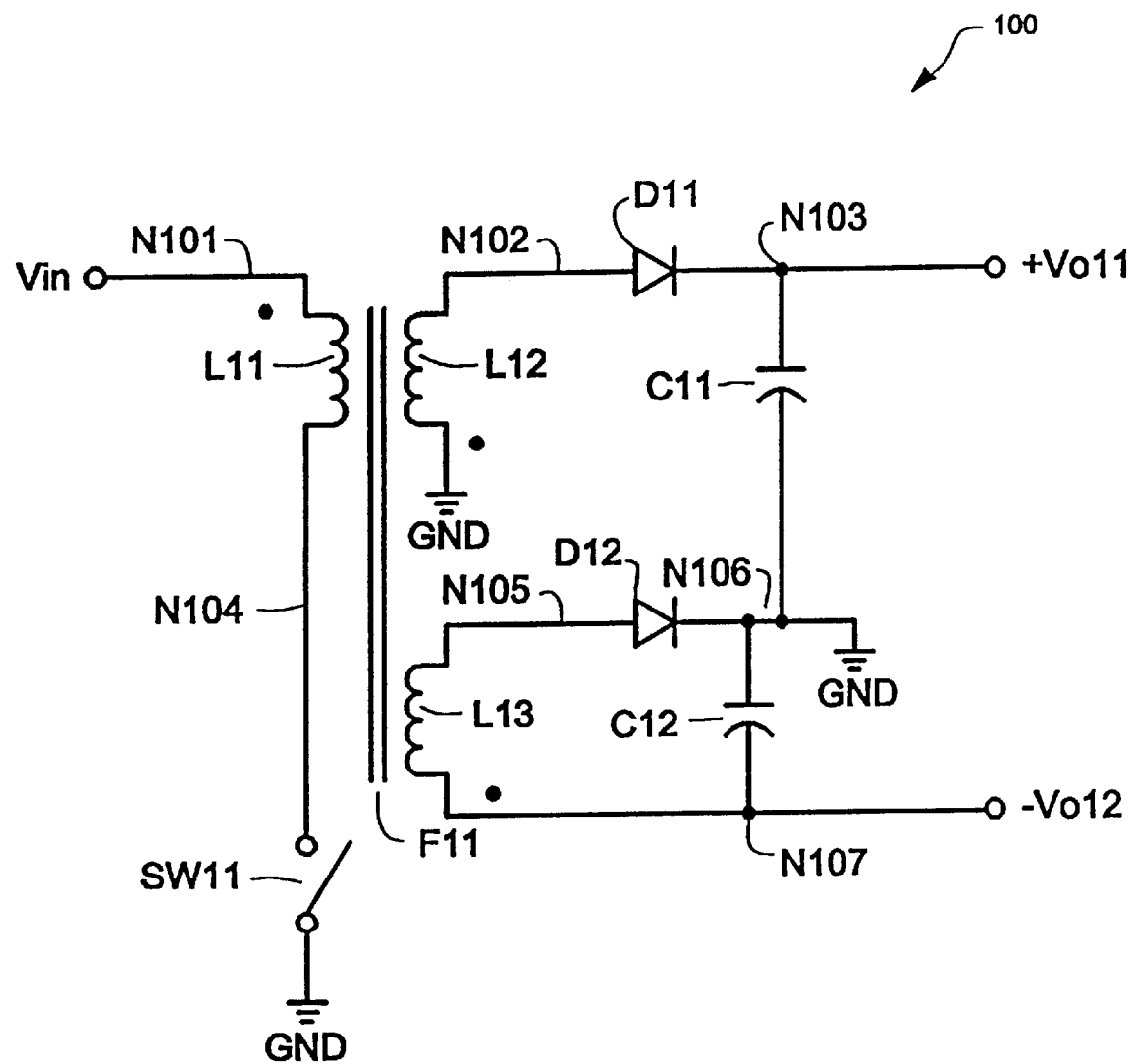
FIG. 1 is a schematic diagram of a conventional two-output flyback converter.

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the invention. The following detailed description is, therefore, not to be taken in a limiting sense, and the scope of the invention is defined only by the appended claims. Referring to the drawings, like numbers indicate like parts throughout the views.

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on". In addition, "battery" includes single cell batteries and multiple cell batteries.

Figure 2:
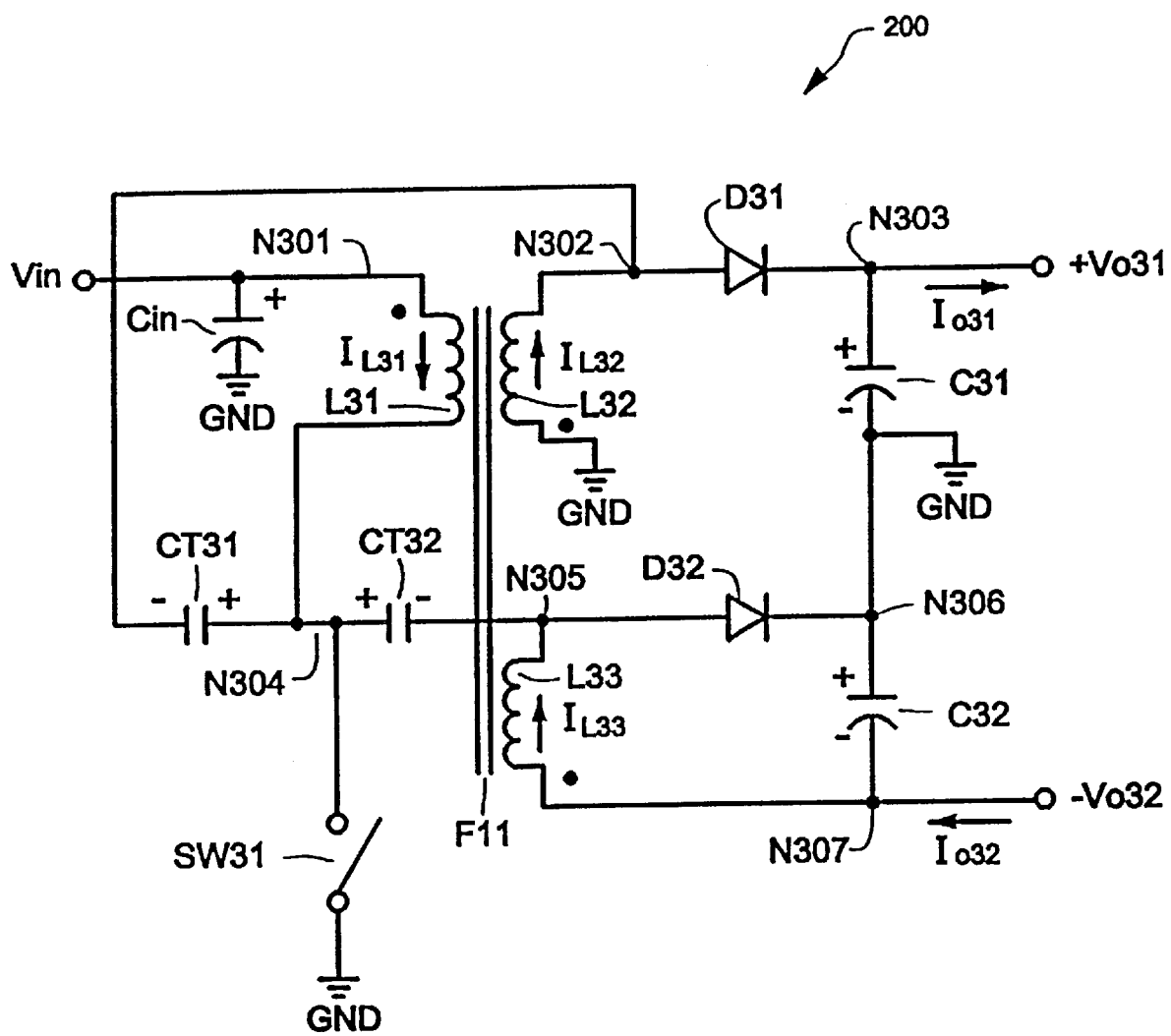
FIG. 2 is a schematic diagram of an exemplary embodiment.

FIG. 2 is a schematic diagram illustrating a first example of a new topology for a two-output converter (200) in accordance with the present invention. The new topology employs transfer capacitance circuitry that is arranged to provide a low input voltage ripple and low ripple on the negative output. The two-output power converter topology (200) shown in FIG. 2, includes an input capacitance circuit (Cin), a first inductive winding (L31), a switching circuit (SW31), a second inductive winding (L32), a third inductive winding (L33), a first output rectifier circuit (D31), a second output rectifier circuit (D32), a first output reservoir capacitor circuit (C31), a second output reservoir capacitor circuit (C32), a first transfer capacitance circuit (CT31), and a second transfer capacitance circuit (CT32).

In FIG. 2, the first inductive winding (L31) is coupled between nodes N301 and N304. The switching circuit (SW31) is coupled between node N304 and a circuit ground potential (GND). The second inductive winding (L32) is coupled between node N302 and a circuit ground potential (GND). The first output rectifier circuit (D31) is coupled between node N302 and node N303. The first transfer capacitance circuit (CT31) is coupled between node N302 and node N304. The first output reservoir capacitor circuit (C31) is coupled between node N303 and a circuit ground potential (GND). The third inductive winding (L33) is coupled between node N305 and node N307. The second output rectifier circuit (D32) is coupled between node N305 and node N306. Node N306 is coupled to a circuit ground potential (GND). The second transfer capacitance circuit (CT32) is coupled between node N304 and node N305. The second output reservoir capacitor circuit (C32) is coupled between node N307 and node N306.

In one exemplary embodiment, the first inductive winding (L31), second inductive winding (L32), and third inductive winding (L33) are all of approximately equal inductance values and are wound on the same core (F11) as shown in FIG. 2.

Although the description has been directed towards a converter topology providing for voltage outputs, this should not be construed as limiting the scope of the invention but as merely providing an illustration of an embodiment of this invention. For example, the outputs could also take the form of current signals, without departing from the spirit or scope of the invention.

Generalized Operation of the Invention

In operation, an input voltage (Vin) is coupled to node N301, and the two-output converter topology (200) provides a first output voltage (Vo31) and a second output voltage (Vo32) at nodes N303 and N307, respectively. The first and second output voltages (Vo31, Vo32) are coupled to a first and second load (not shown). The second output voltage (Vo32) is negative with respect to the first output voltage (Vo31).

In accordance with the invention, the two-output converter topology (200) shown in FIG. 2 has two operating modes. To better illustrate the operational modes, a set of timing charts for current and voltages for several components of the invention have been provided in FIG. 3 and FIG. 4.

Figure 3:
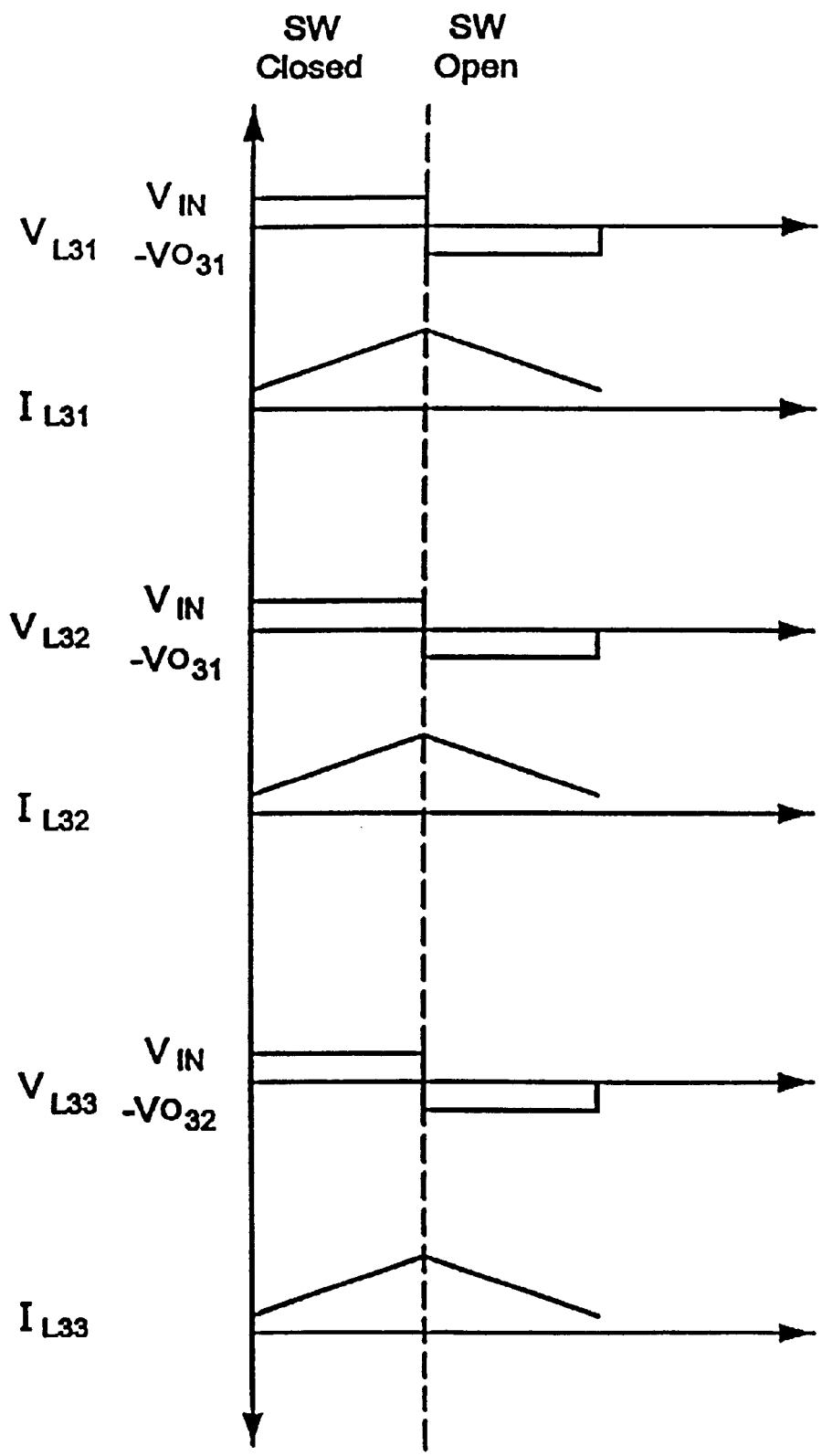
FIG. 3 is a set of timing diagrams for inductive windings of the exemplary embodiment shown in FIG. 2.
Figure 4:
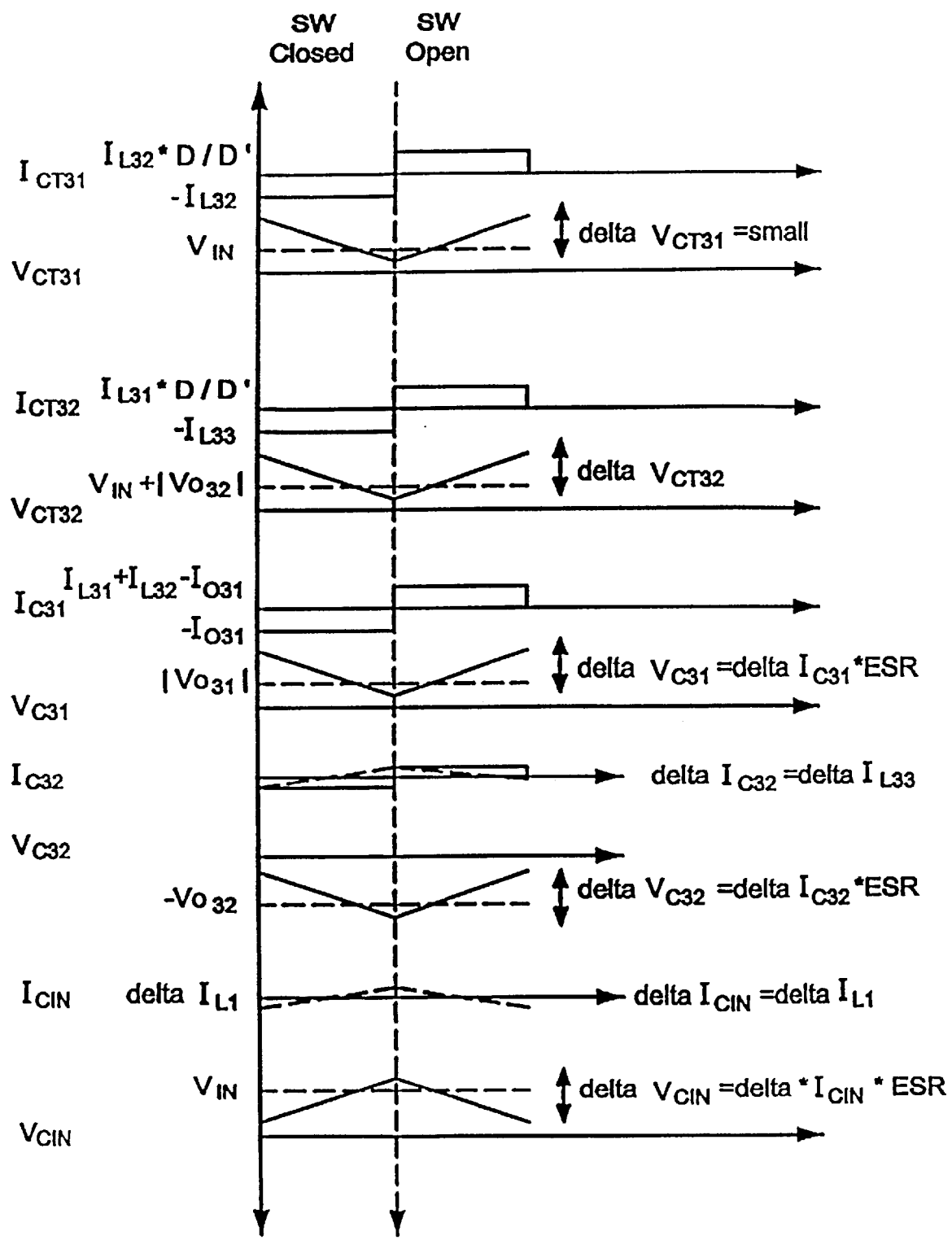
FIG. 4 is a set of timing diagrams for capacitance circuits of the exemplary embodiment shown in FIG. 2.

FIG. 3 illustrates the currents and voltages that are associated with the inductive windings (L31, L32, and L33) as the switching circuit (SW31) is closed and opened. A single cycle of the two-output converter (200) occurs when the switching circuit (SW31) is closed and opened once. The change between open and closed mode occurs at the dashed line shown in the figures. FIG. 4 illustrates the current and voltage for the input capacitance circuit (Cin) of a single duty cycle (D) of the switching circuit (SW31). If the switching circuit (SW31) is ON for time Ton and OFF for time Toff, then the duty cycle (D) is the ratio of Ton to the switching frequency (T), where T=Ton+Toff. The switching circuit (SW31) is on for a period equal to DT, and off for a time interval equal to (1−D)T or equivalently D'T.

Additionally, FIG. 4 illustrates the currents and voltages that are associated with the transfer capacitance circuits (CT31, CT32) and the output reservoir capacitor circuits (C31, C32).

The current flows through the inductive windings (L31–L33) are also illustrated in FIG. 2. Positive current flow is indicated by the direction of the arrow.

First Operating Mode (Switching Circuit Closed)

In the first mode of operation for the two-output converter topology (200), the switching circuit (SW31) is closed and the input voltage (Vin) provides a signal, such as a current signal, to the first inductive winding (L31) through node N301. The current signal ($I_{L31}$) flows through the first inductive winding (L31), and the switching circuit (SW31, which is closed) to the circuit ground potential (GND). While the switching circuit (SW31) is closed, the current signal ($I_{L31}$) increases linearly, storing energy in the magnetic field and establishing a voltage potential ($V_{L31}$) between node N301 and node N304. The timing chart for the current signal ($I_{L31}$) through the first inductive winding (L31) is illustrated in FIG. 3.

During this mode, the first and second output rectifier circuits (D31, D32) are reverse-biased. Energy stored in the first transfer capacitance circuit (CT31) during a previous open mode of operation is transferred through node N302 to the second inductive winding (L32). The operation of the first transfer capacitance (CT31) results in energy that is stored in the magnetic field, charging the second inductive winding (L32), as seen in FIG. 3 by the current raise of $I_{L32}$ and the voltage drop illustrated by $V_{CT31}$ in FIG. 4. Similarly, energy that is stored in the second transfer capacitance circuit (CT32) during the previous open mode is transferred through node N305 to the third inductive winding (L33) effectively charging the third inductive winding (L33). This is illustrated by the current timing chart for $I_{L33}$ in FIG. 3 and the voltage timing chart for $V_{CT32}$ in FIG. 4. The transfer capacitance circuits (CT31, CT32) function similar to a virtual battery source.

As shown in FIG. 3 (by the $V_{CT32}$ timing chart) and FIG. 4 (by the $I_{L33}$ timing chart), as energy is transferred from the second transfer capacitance circuit (CT32) to the third inductive winding (L33) a current signal ($I_{L33}$) is produced. The current signal ($I_{L33}$) flows along a path from the output voltage (−Vo32) through node N307 to the third inductive winding (L33). As the third inductive winding (L33) charges, the current signal flows from the third inductive winding (L33) through the second transfer capacitance circuit (CT32) to the circuit ground potential (GND). As a result, a negative output voltage (−Vo32) is produced across the negative output load in response to the current signal.

Additionally, while the first output rectifier circuit (D31) is reverse-biased, the first output reservoir capacitor circuit (C31) acts as a temporary power supply for the load (not shown) that is connected to node N303. Thus, a current signal ($I_{C31}$) flows from the circuit ground potential (GND) through the first output reservoir capacitor circuit (C31) and is delivered to the load (not shown). In this manner, the first output reservoir capacitor circuit (C31) provides an energy supply to the load resulting in a positive output voltage (Vo31) as illustrated by the voltage drop of $V_{C31}$ in the timing chart of FIG. 4.

Second Operating Mode (Switching Circuit Open)

The switching circuit (SW31) is open during the second mode of operation. During this mode, the first inductive winding (L31) transfers its stored energy to the transfer capacitance circuits (CT31, CT32), and the first and second output rectifier circuits (D31, D32) are forward-biased. As the first inductive winding (L31) transfers its energy, a current signal ($I_{L31}$) flows from the input voltage (Vin) through the first inductive winding (L31). A portion of the current signal ($I_{L31}$) flows through the first transfer capacitance circuit (CT31) such that the first transfer capacitance circuit (CT31) is charged by the first transfer current signal ($I_{CT31}$). This is illustrated in the timing chart for $I_{L31}$ in FIG. 3 and by the timing chart for $V_{CT31}$ in FIG. 4. The current signal ($I_{CT31}$) continues from the first transfer capacitance circuit (CT31) through the first output rectifier circuit (D31) to contribute to the positive output load (not shown). A positive output voltage (Vo31) is produced across the positive output load in response to the current signal.

As shown in FIG. 4, during the second mode of operation, the current signal ($I_{CT31}$) is substantially equal to the ratio of D/D' times the current signal ($I_{L32}$). Moreover, the current signal ($I_{CT31}$) is substantially equal to the ratio of D/D' times the output current signal ($I_{O31}$).

Additionally, a portion of the current signal ($I_{L31}$) from the first inductive winding (L31) also flows through the second transfer capacitance circuit (CT32), effectively charging the second transfer capacitance circuit (CT32) by the second transfer current signal ($I_{CT32}$). The energy transfer is illustrated by the timing charts for $I_{L31}$ and $V_{CT32}$, in FIGS. 3 and 4, respectively. The current signal ($I_{CT32}$) continues from the second transfer capacitance circuit (CT32) through the second output rectifier circuit (D32) to the circuit ground potential (GND) through node N306.

As shown in FIG. 4, the current signal ($I_{CT32}$) during the second mode of operation is substantially equal to the ratio of D/D' times the current signal ($I_{L31}$). In addition, the current signal ($I_{CT32}$) is substantially equal to the ratio of D/D' times the output current signal ($I_{O32}$).

Moreover, while the switching circuit (SW31) is open, the third inductive winding (L33) transfers its stored energy providing a source of current signal ($I_{L33}$) through to the circuit ground potential (GND). The current signal ($I_{L33}$) flows from the negative output through the third inductive winding (L33), through the second output rectifier circuit (D32) to the circuit ground potential (GND), thereby producing the negative output voltage (Vo32) across the negative output load.

While the switching circuit (SW31) is open, the second inductive winding (L32) transfers its stored energy providing an additional source of current signal ($I_{L32}$) to the positive output load. Thus, a current signal ($I_{L32}$) flows from the circuit ground potential (GND) through the second inductive winding (L32), through the first output rectifier circuit (D31) to the positive output load. The result is an additional current signal that is delivered through node N303. The current signal through node N303 is determined by the current signals contributed by the first and second inductive windings (L31, L32), and the first output reservoir capacitor circuit (C31).

Additionally, during the open mode of the switching circuit (SW31), the first output reservoir capacitor circuit (C31) and the second output reservoir capacitor circuit (C32) are "re-charged." This is achieved by a current signal ($I_{C31}$) that flows through the first output reservoir capacitor circuit (C31) to the circuit ground potential (GND), and another current signal ($I_{C32}$) that flows through the second output reservoir capacitor circuit (C32) to the circuit ground potential (GND).

During the operation of the invention, the second output reservoir capacitor circuit (C32) operates different from that of the first output reservoir capacitor circuit (C31). The second output reservoir capacitor circuit (C32) provides virtually no current signal to the second output load (not shown). Rather, the principal source of current signal to the second output load at node N307 is provided by the third inductive winding (L33) during both modes of operation of the invention. Instead, the second output reservoir capacitor circuit (C32) is arranged to absorb any ripple in the current signal through the third inductive winding (L33), and allows the dc portion of the third inductive winding current signal ($I_{L33}$) to flow to the second output load. The second output reservoir capacitor circuit (C32) also serves as an energy storage that provides an instantaneous current signal to the second output load (not shown) during transients. The ripple on the negative second output voltage (Vo32) is lower than that of the conventional two-output flyback converter shown in FIG. 1. The current signal through the second output reservoir capacitor circuit (C32) is approximately determined by the current signal flow from the third inductive winding (L33). As shown in the timing chart for $V_{C32}$ in FIG. 4, the change in voltage across the second output reservoir capacitor circuit (C32) is approximately the change in current signal through the third inductive winding (L33) times the effective series resistance (ESR) of the second output reservoir capacitor circuit (C32), yielding a low negative output voltage ripple.

Features

Additionally, the invention is directed at providing a low input ripple as shown by the voltage through the input capacitor circuit (Cin) shown in the timing chart for $V_{CIN}$ in FIG. 4. The input capacitance circuit (Cin) as shown in FIG. 2 is coupled between node N301 and a circuit ground potential (GND). The input capacitance circuit (Cin) provides a conduction path for current signal spikes that arise through the first inductive winding (L31) when the switching circuit transitions from one operating position to the other operating position. However, the input capacitance circuit (Cin) is an optional circuit that need not be employed in all embodiments of the invention.

Poor output voltage precision in a conventional two-output flyback converter often is a result of the non-ideal characteristics of the components used in the circuit. For example, leakage inductances have a first-order effect on precision matching for the auxiliary outputs.

Precision matching for the output voltages is affected by how energy in the primary transformer winding (L11) is shared between the tertiary transformer winding (L13) and the secondary transformer winding (L12) when the switching device (SW11) is turned off (open). Initially, the majority of current signal will be transferred to that output with the smallest leakage inductance. Such leakage inductances may be represented in the two-output flyback converter as additional components with voltages proportional to the turns ratio between the tertiary transformer winding (L13) and the secondary transformer winding (L12), and current signals inversely proportional to the turns ratio. In the conventional two-output flyback converter, of FIG. 1, the secondary output voltage (Vo12) then becomes directly proportional to the turns ratio of the tertiary transformer winding (L13) to the secondary transformer winding (L12). Selection of the turns for a non-fedback output however, is an expensive and difficult endeavor. Improper selection of the turns results in a feedback signal being sent to the switching device (SW11) to terminate its duty cycle (D) either too soon or too late, resulting in overshoots or undershoots of the non-fedback output voltage. Such miss-shoots in the non-fedback output voltage (Vo11 or Vo12) appear as poorly matched output voltages.

The incorporation of the transfer capacitance circuits (CT31, CT32) in the present invention is directed to minimize the contribution of leakage inductances on the shapes of the winding current signal waveforms, resulting in improved precision in matching output voltages (Vo31, Vo32). As a result, the output voltages in the present invention are proportional to the duty cycle (D) of the switching circuit (SW31) and not on the precision of the turns ratio of the third inductive winding (L33) to the second inductive winding (L32). The present invention is directed to provide voltages for the outputs (Vo31, Vo32) that are closer together in their magnitudes, resulting in higher precision in matching output voltage.

Selection of the capacitance values for the transfer capacitance circuits (CT31, CT32) is dependent upon the amount of energy that needs to be transferred to the output loads during the operating modes of the invention. As the output load increases, more energy will need to be transferred from the transfer capacitance circuits (CT31, CT32) to maintain a relatively constant output voltage. Additionally, the size of the transfer capacitance circuits (CT31, CT32) is related to the switching frequency of the switching circuit (SW31). In one example, the capacitance values for the transfer capacitance circuits (CT31, CT32) is approximately one-tenth of the values selected for the output reservoir capacitor circuits (C31, C32). However, other capacitance values may be utilized without departing from the spirit or scope of the invention.

Additionally, the present invention is directed at providing reduced voltage requirements on the switching circuit (SW31) of FIG. 2. In a conventional flyback converter, such as the two-output flyback converter (100) shown in FIG. 1, the voltage across the switching circuit (SW11) when the switch is open is determined by the sum of the input voltage (Vin), a reflected secondary voltage (which is a function of the turns ratio times the secondary output voltage (Vo12)), and a leakage inductance spike. The leakage inductance spike is a result of the leakage inductance of the transformer windings (L11–L13). Energy stored in the leakage inductance appears as a spike in voltage when the switching circuit (SW11) is turned off (opened). Typically, this voltage spike in the convention flyback converter is reduced by the introduction of an additional circuit, such as a snubber circuit, that is connected across the primary transformer winding (L11). The snubber circuit is necessary to reduce the working voltage requirements of the switch. Since the transformer windings are not required to be coupled to one another in the present invention, there is no substantial influence of the leakage inductance on the voltage across the switching circuit (SW31). The voltage on the switching circuit (SW31) is approximately equal to the input voltage (Vin) plus the secondary output voltage (Vo32). Consequently, a snubber circuit is not required and the working voltage requirements for the switching circuit (SW31) are reduced in the present invention.

Other Embodiments of the Invention

Figure 5:
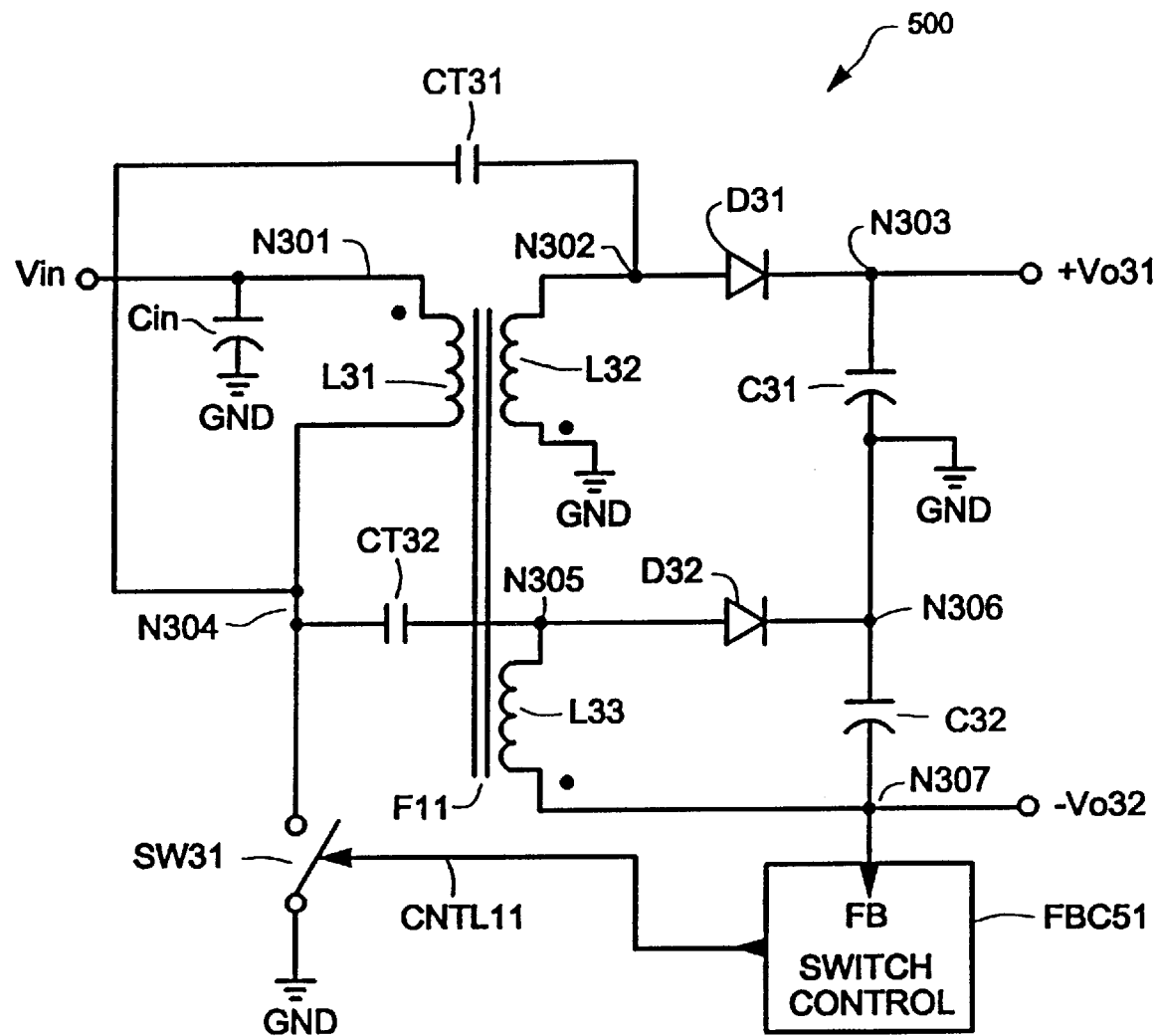
FIG. 5 is a schematic diagram of another exemplary embodiment incorporating a feedback switch control device.

FIG. 5 is a schematic diagram of another embodiment of the invention illustrating a multiple output converter topology (500) including a feedback switch control circuit (FBC51). As shown in FIG. 5, the multiple output converter topology (500) is substantially similar to the system as shown in FIG. 2. However, the feedback switch control circuit (FBC51) is included in the multiple output converter topology (500) to control the switching circuit (SW31). The feedback switch control circuit (FBC51) monitors a potential at node N307, or any other node as may be desired, and produces a control signal at a control node (CNTL11). The switching circuit (SW31) includes a control input terminal that is coupled to the control node (CNTL11). The switching circuit (SW31) is actuated by the control signal. In FIG. 5, the transfer of energy to the third inductive windings (L33) is controlled to maintain the second output voltage (Vo32) independently of load and input voltage (Vin) changes.

Although FIG. 5 shows the feedback switch control circuit (FBC51) as regulating the second output voltage (Vo32), the feedback switch control circuit (FBC51) may be arranged to regulate any other output voltage signal as may be desired. For example, the first output voltage (Vo31) could be regulated through a modified feedback switch control circuit (FBC51). In addition, a combination of various output voltages may be monitored by the feedback switch control circuit (FBC51) to determine an optimal switching time.

In one example, the feedback switch control circuit (FBC51) is a pulse width modulation circuit (PWM) that is driven at a constant frequency by an oscillator. The oscillator may be a local oscillator or an internal oscillator. Optionally, the feedback switch control circuit (FBC51) may be implemented to regulate the characteristics of the current signal in the invention. For example, the switching circuit (SW31) may be open or closed by various methodologies such as peak current mode control or average current mode control methodologies.

Figure 6:
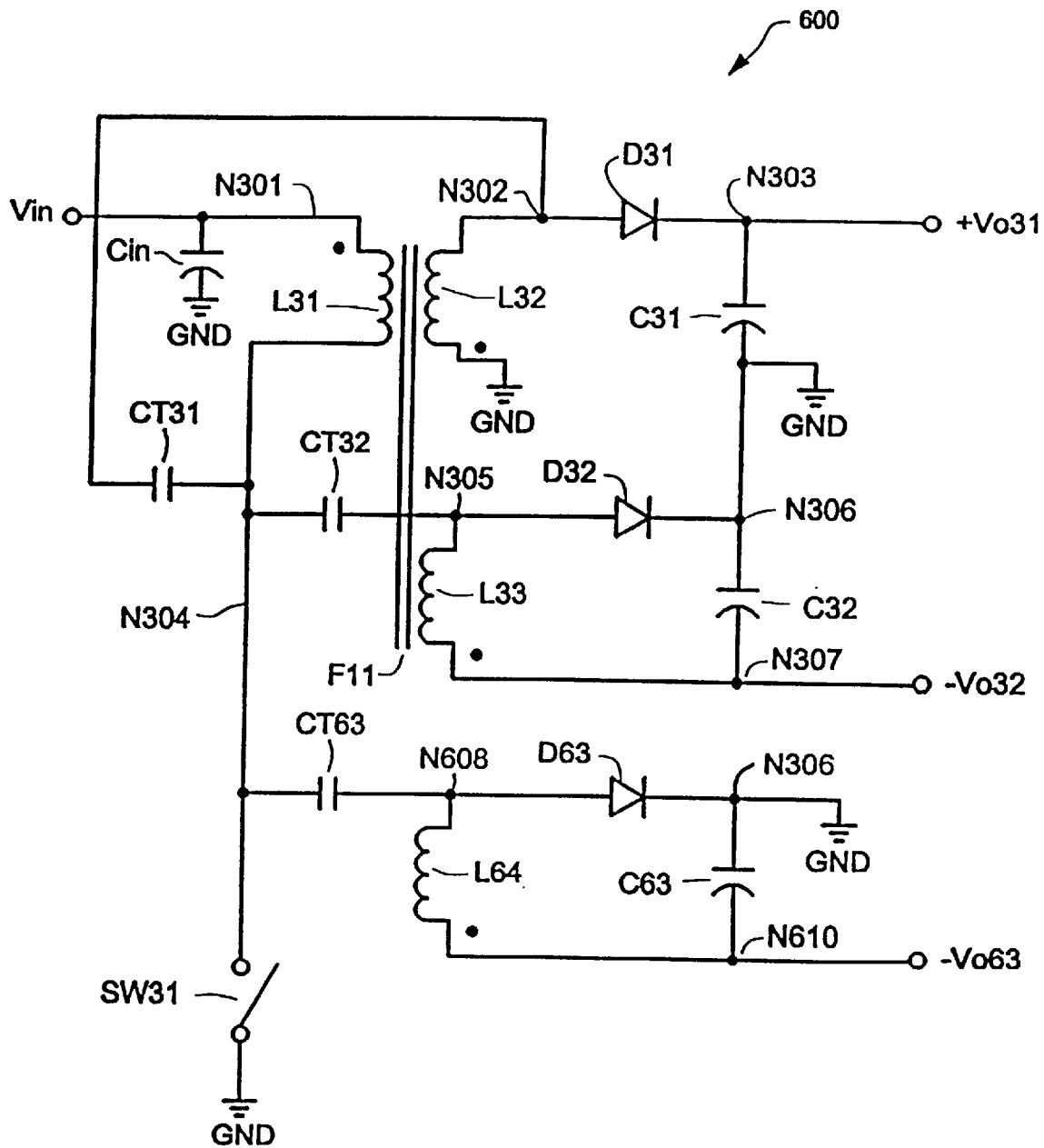
FIG. 6 is a schematic diagram of yet another exemplary embodiment.

FIG. 6 is a schematic diagram illustrating a three-output converter topology (600) in accordance with the present invention. The system as shown in FIG. 5 is substantially similar to the system as shown in FIG. 2. However, the three-output converter topology (600) includes the following additional components: a third transfer capacitance circuit (CT63), and fourth inductive winding (L64), a third output rectifier circuit (D63), and a third output reservoir capacitor circuit (C63).

The third transfer capacitance circuit (CT63) is coupled between node N304 and node N608. The fourth inductive winding (L64) is coupled between node N608 and node N610. The third output rectifier circuit (D63) is coupled between node N608 and node N306. The third output reservoir capacitor circuit (C63) is coupled between node N610 and node N306.

The embodiment illustrated in FIG. 6, operates substantially similar to the system as shown in FIG. 2. In operation, an input voltage (Vin) is coupled to node N101 and the three-output converter topology (600) provides a third output voltage (Vo63) at node N610. The third output voltage (Vo63) is coupled to a third output load (not shown). The third output at node N610 may alternatively be a current signal, without departing from the spirit or scope of the invention.

FIG. 6 further illustrates that the present invention is directed towards providing the benefit of higher precision in matching output voltages. The fourth inductive winding (L64) may take the form of an additional winding on the same core (F11), as shown in the figure. In some instances, the fourth inductive winding (L64) may be a separate inductor (not wound on core F11), thereby reducing the cost and complexity of the circuit.

The embodiment illustrated in FIG. 6 may be employed to isolate sections of a system where it is not desirable to have noise fed back into the input signal source. For example, it may be desirable to isolate the output and input voltage signals for an analog section and a digital section of a system.

Additionally, the third output voltage (Vo63) may be of a different magnitude from the second output voltage (Vo32). This may be obtained by the elimination of a third transfer capacitance circuit (CT63) between nodes N304 and N608, and coupling of the fourth inductive winding (L64) to node N307. The fourth inductive winding (L64) would have a turns ratio different from that of the second inductive winding (L63).

Figure 7:
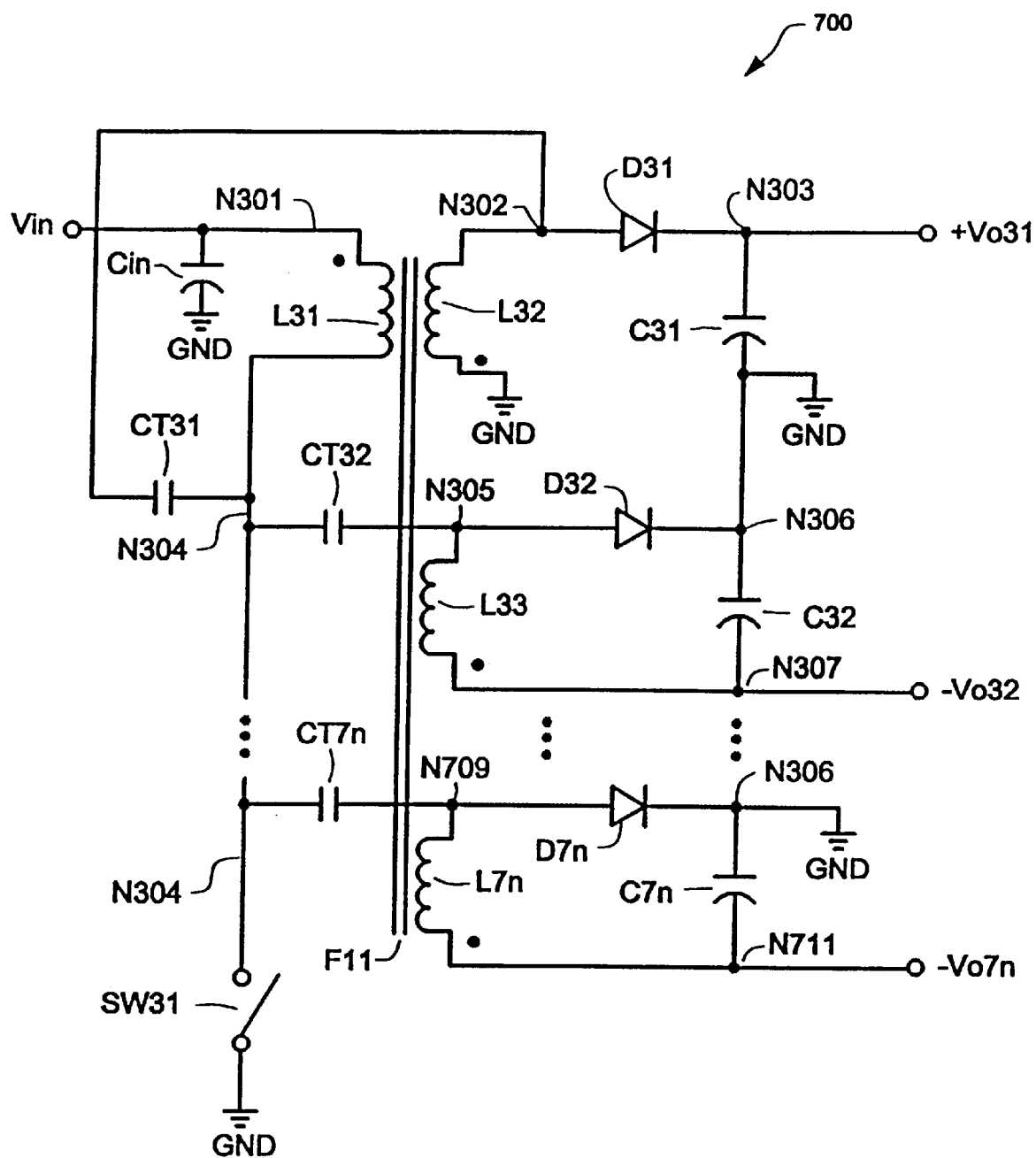
FIG. 7 is a schematic diagram of an exemplary embodiment of an n-output voltage power converter, in accordance with the present invention.

FIG. 7 is a schematic diagram of yet another embodiment of the present invention including an n-output converter topology (700). The system as shown in FIG. 7 is substantially similar to the system as shown in FIG. 2. However, the two-output converter topology of FIG. 2 has been extended to n-output voltages by including an $n^{th}$ transfer capacitance circuit (CT7n), an $(n+1)^{th}$ inductive winding (L7n), an $n^{th}$ output rectifier circuit (D7n), and an $n^{th}$ output reservoir capacitor circuit (C7n). In the figure, the $n^{th}$ transfer capacitance circuit (CT7n) is coupled between node N304 and node N709. The $(n+1)^{th}$ inductive winding (L7n) is coupled between node N709 and node N711. The $n^{th}$ output rectifier circuit (D7n) is coupled between node N709 and node N306, and the $n^{th}$ output reservoir capacitor circuit (C7n) is coupled between node N711 and node N306. Node N306 is again coupled to a circuit ground potential (GND).

In operation, the input voltage (Vin) is coupled to node N101 and the n-output converter topology (700) provides an $n^{th}$ output voltage (Vo7n) at node N711. The $n^{th}$ output voltage (Vo7n) is coupled to an $n^{th}$ output load (not shown).

The core (F11) may optionally be extended to the $(n+1)^{th}$ inductive winding (L7n). The additional inductive windings may alternatively be arranged as inductors rather than additional windings on the same core (F11). It should also be recognized that while the n-output converter topology (700) does not illustrate a feedback switch control circuit (FBC51) as was illustrated in FIG. 5, such a control circuit could readily be extended to the n-output topology. Thus, any number of outputs may be provided by extending the multiple output converter topology to "n" output circuits.

Moreover, while both embodiments illustrated in FIG. 6 and FIG. 7 has extended the negative output voltages (−Vo63 in FIG. 6, and −Vo7n in FIG. 7), the invention is not so limited. Positive output voltages or negative output voltages could duplicated by the appropriate arrangement of components, including the $n^{th}$ transfer capacitance circuit (CT7n), the $(n+1)^{th}$ inductive winding (L7n), the $n^{th}$ output rectifier circuit (D7n), and $n^{th}$ output reservoir capacitor circuit (C7n).

In the above illustrations, the output rectifier circuit has been illustrated using the diode symbol. However, in light of the above disclosure, those skilled in the art will recognize that the invention is not limited to a diode implementation. For example, the output rectifier circuit could be any circuit design that inhibits reverse signal flow during a portion of the topology operation. As such, the output rectifier circuit could be a MOSFET, a BJT, a thyristor, GTOs, or even a simple switching mechanism, or a combination of one or more components arranged to operate as a forward conduction and reverse blocking circuit.

Similarly, the switching circuit (SW31) could be a MOSFET, a BJT, a thyristor, GTOs, diode, or any other type of circuit that has a selectable conduction cycle and blocking cycle, without departing from the spirit or scope of the invention.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for producing multiple output signals from an input signal, the apparatus comprising:

a switching circuit that has an open position and a closed position;

a first inductive winding;

a second inductive winding that is magnetically coupled to the first inductive winding;

a first transfer capacitance circuit that is coupled to the first inductive winding and the second inductive winding;

a first rectifier circuit that is coupled to the second inductive winding and a first output terminal;

a first output capacitance circuit that is coupled to the first output terminal and a circuit ground potential;

a third inductive winding;

a second transfer capacitance circuit that is coupled to the first inductive winding and the third inductive winding;

a second rectifier circuit that is coupled to the third inductive winding and the circuit ground potential; and a second output capacitance circuit that is coupled to the second output terminal and the circuit ground potential, wherein the first and second transfer capacitance circuits store energy in response to the input signal when the switching circuit is in the closed position, and the first and second transfer capacitance circuits transfer energy through the first and second output terminals respectively when the switching circuit is in the open position such that a first one of the multiple output signals is associated with the first output terminal and a second one of the multiple output signals is associated with the second output terminal, whereby the working voltage requirements for the switching circuit are reduced without the necessity of a snubber circuit.

2. The apparatus in claim 1, wherein the output signal associated with the first output terminal and the output signal associated with the second output terminal have substantially the same magnitude.

3. The apparatus in claim 1, wherein the switching circuit alternates between the open position and the closed position at a frequency that is related to a signal level that is associated with at least one of the multiple output signals.

4. The apparatus in claim 3, wherein the signal level is determined by a negative polarity voltage.

5. The apparatus in claim 3, wherein the signal level is determined by a positive polarity voltage.

6. The apparatus in claim 1, wherein the first, second, and third inductive windings are wound on a common core.

7. The apparatus in claim 1, wherein the third inductive winding is magnetically coupled to the first inductive winding.

8. The apparatus as in claim 1, further comprising:
at least one additional circuit that is arranged to provide an additional one of the multiple output signals, each additional circuit having:
an additional inductive winding;
an additional transfer capacitance circuit that is coupled to the first inductive winding and the additional inductive winding;
an additional rectifier circuit that is coupled to the additional inductive winding and an additional output terminal; and
an additional output capacitance circuit that is coupled to the additional output terminal and the circuit ground potential, wherein the additional transfer capacitance circuit is arranged to store energy in response to the input signal when the switching circuit is in the closed position, and the additional transfer capacitance circuit is arranged to transfer energy through the additional output terminal when the switching circuit is in the open position such that a third one of the multiple output signals is associated with the additional output terminal.

9. The apparatus as in claim 1, further comprising at least one additional circuit that is arranged to provide an additional one of the multiple output signals, each additional circuit including:
an additional inductive winding;
an additional transfer capacitance circuit that is coupled to the first inductive winding and the additional inductive winding;
an additional rectifier circuit that is coupled to the additional inductive winding and an additional output terminal and the circuit ground potential; and
an additional output capacitance circuit that is coupled to the additional output terminal, wherein the additional transfer capacitance circuit is arranged to store energy in response to the input signal when the switching circuit is in the closed position, and the additional transfer capacitance circuit is arranged to transfer energy through the additional output terminal when the switching circuit is in the open position such that a third one of the multiple output signals is associated with the additional output terminal.

10. A method for providing output signals to a first and second output load circuit in response to an input signal, comprising:
closing a switching circuit during a first operating mode;
opening a switching circuit during a second operating mode;
charging a first inductive winding in response to the input signal during the first operating mode;
coupling magnetic energy from the first inductive winding to a second inductive winding;
charging the second inductive winding through a first transfer capacitance circuit during the first operating mode;
charging the third inductive winding through a second transfer capacitance circuit during the first operating mode;
providing a first one of the output signals to the first output load from a first output capacitor during the first operating mode;
providing a second one of the output signals to the second output load from a second output capacitor and through the second inductive winding and the second transfer capacitance circuit during the first operating mode;
storing energy in the first output capacitance circuit during the second operating mode;
storing energy in the first transfer capacitance circuit during the second operating mode;
storing energy in the second transfer capacitance circuit during the second operating mode;
providing the first one of the output signals to the first output load from the second inductive winding and the first transfer capacitance circuit during the second operating mode; and
providing the second one of the output signals to the second output load from the third inductive winding and the second transfer capacitance circuit during the second operating mode.

11. The method in claim 10, wherein the first one of the output signals and the second one of the output signals have substantially the same magnitude.

12. The method in claim 10, further comprising: coupling magnetic energy from the first inductive winding to the third inductive winding.

13. An apparatus that is arranged to convert an input voltage from a signal source to a first and second output voltages that are provided to first and second load circuits respectively, comprising:
a transformer circuit that includes a first inductive winding circuit, a second inductive winding circuit, and a third inductive winding circuit, wherein the first inductive winding is coupled to the signal source such that the first inductive winding is charged by the input voltage;
a switching circuit that is coupled to a circuit ground and the first inductive winding circuit of the transformer circuit;
a first capacitance circuit that is arranged to couple a first signal from the first inductive winding circuit to the second inductive winding circuit;
a second capacitance circuit that is arranged to couple a second signal from the first inductive winding circuit to the third inductive winding;
a first rectifier circuit that is coupled to the second inductive winding circuit and the first load circuit;
a second rectifier circuit that is coupled to the third inductive winding and the circuit ground, wherein the third inductive winding is coupled to the second load circuit;
a first output capacitance circuit that is coupled to the first rectifier circuit and the circuit ground; and
a second output capacitance circuit that is coupled to the third inductive winding and the circuit ground, such the first and second output voltages that are provided to the first and second load circuits have magnitudes that are closely matched, whereby the working voltage requirements for the switching circuit are reduced without the necessity of a snubber circuit.

14. An apparatus for providing a positive output signal to a first output load and a negative output signal to a second output load circuit in response to an input signal, comprising:

a first inductive means that stores energy in response to the input signal;

a first charging means that charges the first inductive means when active;

a first capacitive means that is coupled across the first output load circuit and arranged store energy when the first charging means is inactive, the first capacitive means providing the first output signal to the first output load circuit when the first charging means is active;

a second inductive means that is magnetically coupled to the first inductive means, wherein the second inductive means is selectively coupled across the first output load circuit when the first charging means is inactive;

a second charging means that is charged by the first inductive means when the first charging means is inactive, the second charging means being arranged to charge the second inductive means when the first charging means is active, such that the second inductive means and the second charging means provide energy to the first output load circuit when the first charging means is inactive;

a third inductive means that is selectively coupled across the second output load circuit; and a third charging means that is charged by the first inductive means when the first charging means is inactive, the third charging means being arranged to charge the third inductive means when the first charging means is active, such that the third inductive means provides energy to the second output load circuit and the third charging means provides energy to the second output load circuit when the first charging means is inactive, whereby the energy to the first output load circuit and the energy to the second output load circuit have substantially the same magnitude.

15. An apparatus as in claim 14, further comprising a second capacitive means that is coupled across the second output load circuit.

16. An apparatus as in claim 14, further comprising a rectification means that is arranged to selectively couple the second inductive means to the first output load circuit such that the second inductive means is effectively coupled across the first output load circuit when the rectification means is active.

17. An apparatus as in claim 14, further comprising a rectification means that is arranged to selectively couple the third inductive means across to a circuit ground potential such that the third inductive means is effectively coupled across the second output load circuit when the rectification means is active.

* * * * *